United States Patent

[11] 3,585,915

| [72] | Inventors | Sukeyuki Oki<br>Clifton;<br>Gary Kaess, Fair Lawn; Edwin E. Faris,<br>Wayne, all of, N.J. |
|---|---|---|
| [21] | Appl. No. | 827,649 |
| [22] | Filed | May 26, 1969 |
| [45] | Patented | June 22, 1971 |
| [73] | Assignee | Atlas-Rand Corporation<br>Paramus, N.J. |

[54] FILM METERING MECHANISM FOR CAMERAS
30 Claims, 16 Drawing Figs.

[52] U.S. Cl. .................................................. 95/11.5 R,
95/31 FM, 240/37.1
[51] Int. Cl. .................................................. G03b 9/70
[50] Field of Search ..........................................240/1.3, 37,
37.1; 95/11, 11 L, 11.5, 31

[56] References Cited
UNITED STATES PATENTS
| 3,363,526 | 1/1968 | Ernisse................ | 95/11.5 |
| 3,416,424 | 12/1968 | Harvey................ | 95/11 X |
| 3,464,335 | 9/1969 | Irwin.................... | 95/11 |

Primary Examiner—Samuel S. Matthews
Assistant Examiner—Fred L. Braun
Attorney—Ralph R. Roberts ABSTRACT: A film metering advance and flashcube socket mechanism for flash cameras includes a biased film perforation locator disposed so as to engage a perforation of the film. As the film is advanced the locator enters the perforation and moves with the film to a stop position whereat the filmwind is stopped from further advance. A rotatable socket adapted to removably receive and retain a multilamp photoflash unit is engaged by a stop so as to be maintained in a fixed position until an exposure actuation is made by a finger-actuated kick lever. With the operation of the kick lever, the socket is released so as to be rotated for one-quarter of a revolution during which time the contacts of one of the lamps of the photoflash unit are brought into conductive engagement with a battery source in the camera. A lock or stop is provided and is disposed to engage the finger-actuated kick lever so as to prevent a double exposure from being made. The camera shutter is actuated in response to rotation of the socket.

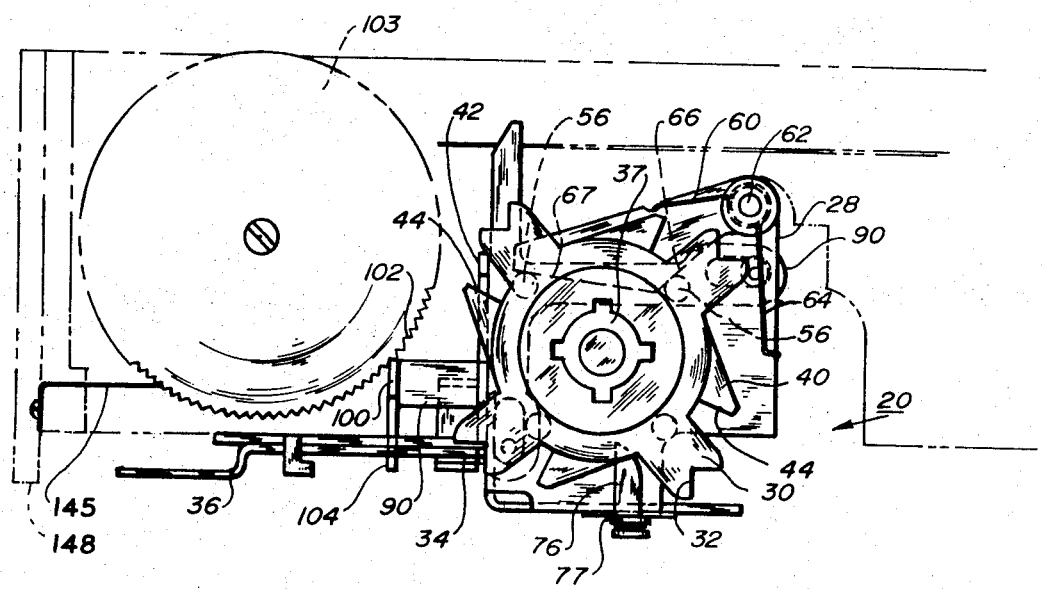
Fig_2
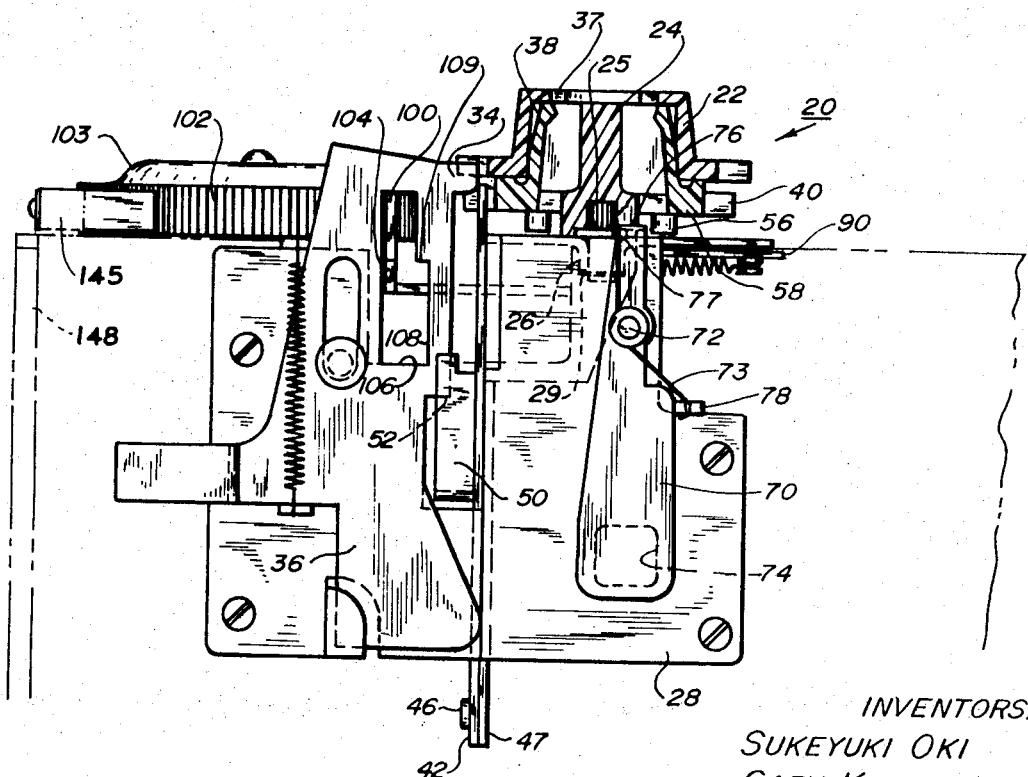
INVENTORS.
SUKEYUKI OKI
GARY KAESS
EDWIN E. FARIS
BY
Ralph K. Roberts
AGENT.
Fig_1

INVENTORS.
SUKEYUKI OKI
GARY KAESS
EDWIN E. FARIS

BY

Ralph R. Roberts
AGENT.

INVENTORS.
SUKEYUKI OKI
GARY KAESS
EDWIN E. FARIS

BY

*Ralph K. Roberts*
AGENT.

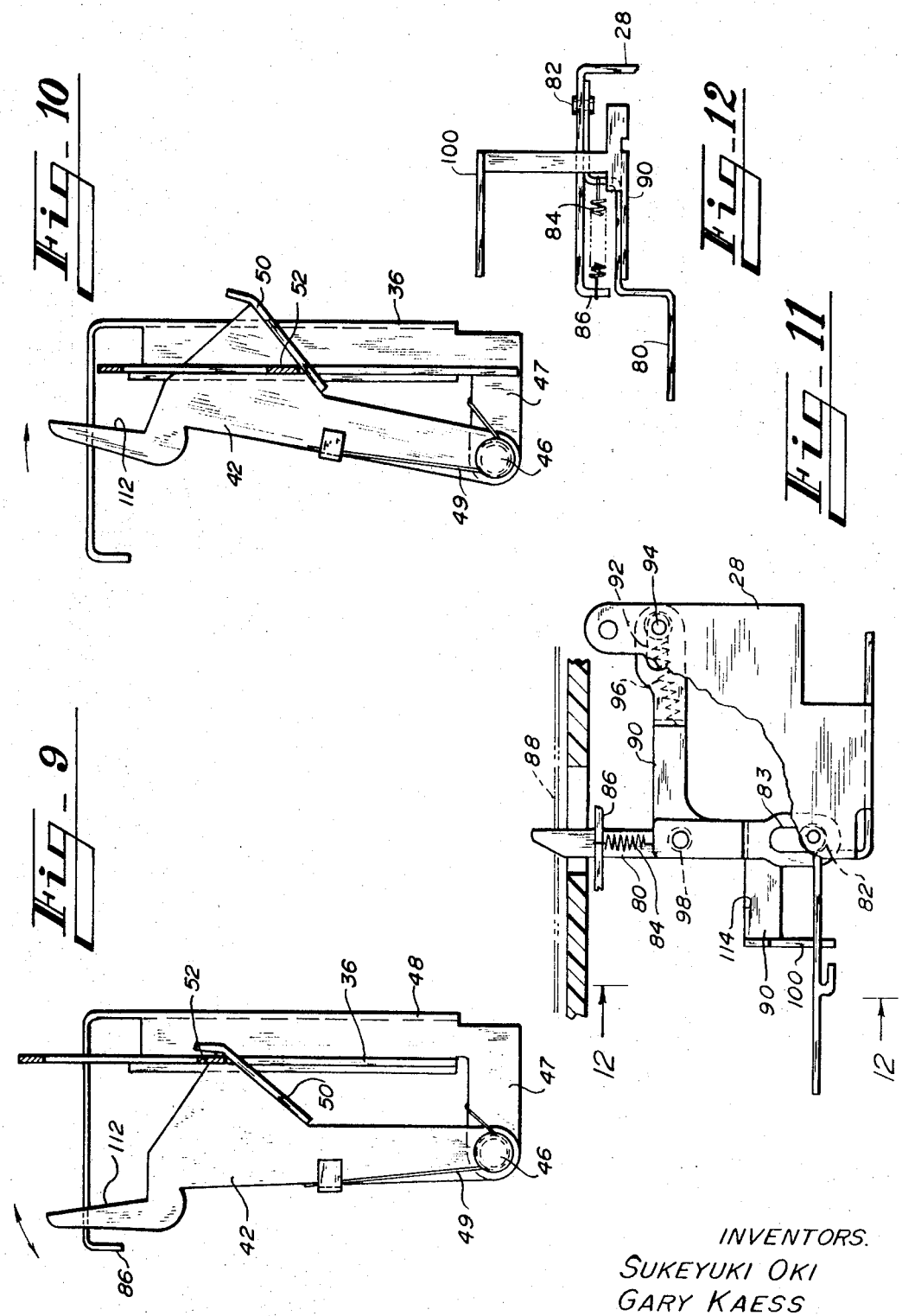

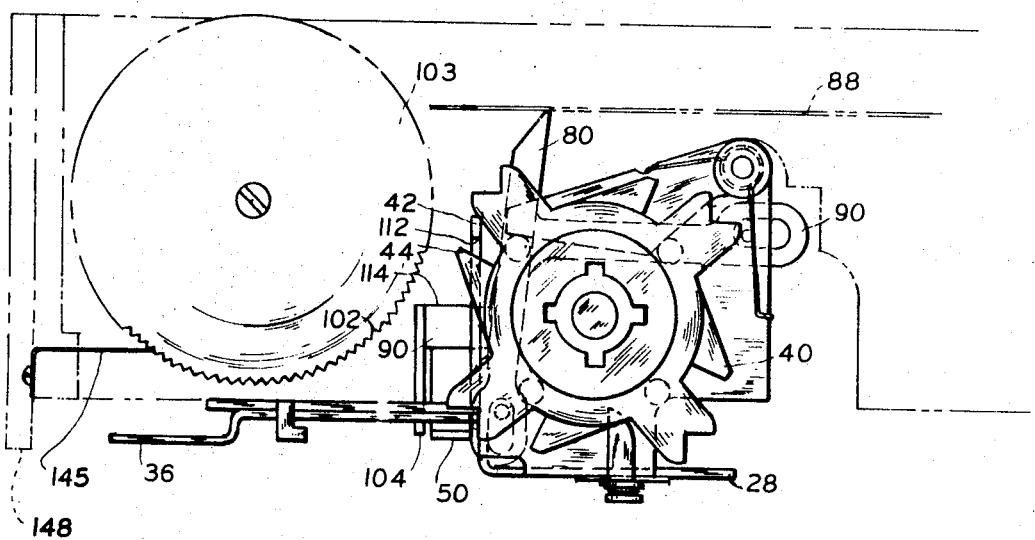
Fig_14
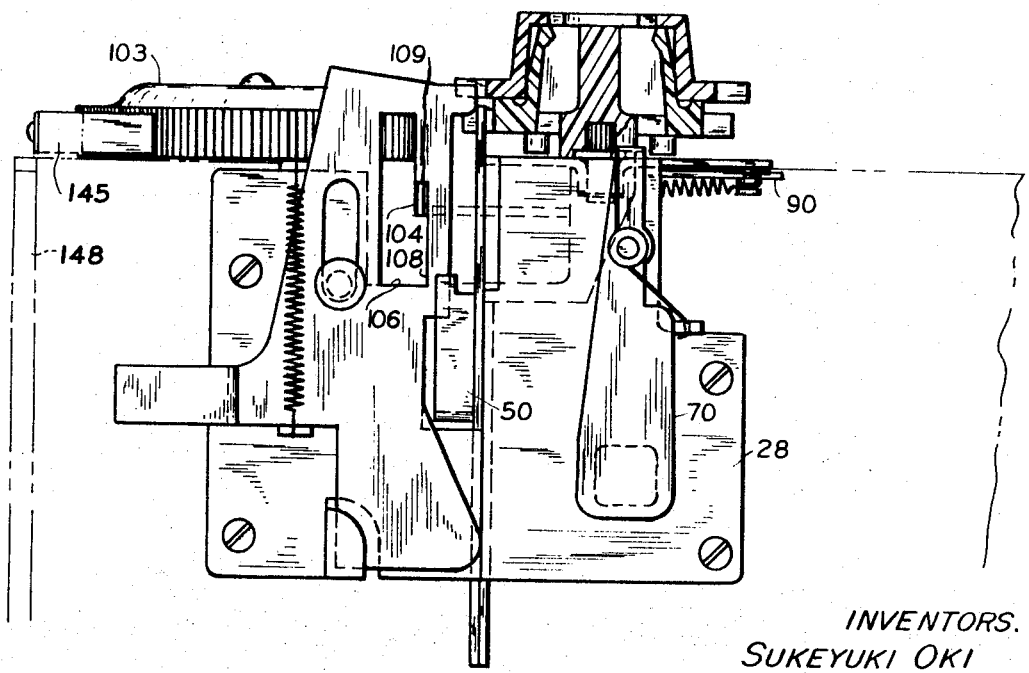
Fig_13
INVENTORS.
SUKEYUKI OKI
GARY KAESS
EDWIN E. FARIS
BY
Ralph K. Roberts
AGENT.

INVENTORS.
SUKEYUKI OKI
GARY KAESS
EDWIN E. FARIS

BY
Ralph K. Roberts
AGENT.

FILM METERING MECHANISM FOR CAMERAS

BACKGROUND OF THE INVENTION

1. Field of the Invention

The field of art to which this invention relates is a photographic camera mechanism with illumination and exposure synchronization system.

2. Description of the Prior Art

With the development and acceptance of a disposable multilamp photoflash unit or package for use with still cameras, there have been marketed several still cameras, each having a socket and mechanism for receiving and indexing this photoflash package. Insofar as is known, the indexing mechanism of these cameras successively place a fresh or unfired lamp in an electronic firing circuit and, on the occasion of the actuation of the shutter mechanism, the firing circuit is closed by a switch means so as to fire the lamp.

It is also known to fire the lamp and, after ignition begins, to rotate the bulb so as to distribute the flash of light. Such a flash system is shown in U.S. Pat. No. 3,363,526 issued Jan. 16 1968 to P. J. Ernisse. In this patent the flash cube or package is disposed at a predetermined first position which is preferably at 15 to 30° previous to, or from a line parallel to, the lens axis of the camera. The rotation of the flash lamp package of the Ernisse patent is preferably driven by a spring mechanism previously wound during the advancing of the film and the cocking or setting of the shutter apparatus.

It is also known to meter the advance of the film by means of winding mechanism and a perforation stop. In such known mechanisms the shutter is also cocked with or during the film advance so that when the exposure actuation is taking place, the shutter is released. In certain applications, the speed of exposure is manually adjustable. In most of the know flash cameras, means are provided for preventing a double exposure of the film.

In the photographic camera of this invention, the flash cube or package is removably mounted in a rotatable socket disposed so that in its predetermined first position the flashcube to be "fired" is at right angles to the axis of the lens of the camera. This mechanism, to cause an exposure to be made, causes the socket to be rotated between established limits, which limits are preferably from a position at right angles to the axis of the lens of the camera to a position parallel to the axis of the lens. During this rotation the contact leads of one lamp are brought into engagement with electrical contacts conductively supplied with current from a battery source. The rotation of the socket causes a protruding portion of the socket to engage and actuate a pivoted shutter member which is biased to its closed position, to cause an exposure to be made. The mechanism of this invention has the shutter moved against the bias of a spring to be moved into a film exposure condition. The rotating movement of the lamp contacts over the conductive contacts insures a wiping sure contact without the need of and the unsure action of a snap switch. This engaging of the contacts is in a synchronized segment of socket rotation which corresponds to the engagement of the shutter.

SUMMARY OF THE INVENTION

The camera mechanism of this invention includes a rotatable socket carried on the top portion of the camera body. The rotation of this pocket causes a pivoted shutter member to be moved to uncover an aperture for admitting light to the film. The mechanism for actuating the rotation includes a release lever having a tab which engages a notch on the rotatable socket to prevent the socket from being rotated until the release lever is moved downwardly. In its downward movement, the release lever actuates a kick lever which engages means on the socket to rotate the socket at least one-eighth of a revolution. A spring-biased camming member is disposed to engage a pin on the socket and at a determined position in its rotation, the camming member engages this pin to propel the socket to a determined "at-rest" or finished position.

The film advance mechanism includes a rotatable winding knob having engaging teeth into which an end of a stop arm enters to stop the further rotation of the knob. A film perforation locator member is disposed and adapted to enter and engage the perforation of the film and as the film is wound, it moves an end of the stop arm toward and into retaining engagement with the teeth portion of the knob. The stop arm also has means to engage the release lever so as to prevent a double exposure until the film has been advanced to a new and unexposed position.

It is an object of this invention to provide a camera mechanism wherein a rotatable socket is adapted to removably receive a multilamp photoflash and with the socket rotated so as to be brought in way of a pair of fixed electrical contacts leading from a battery source and as the lamp is ignited, means from the socket engages a shutter lever to move the shutter from in way of an aperture to expose a portion of the film.

It is a further object of this invention to provide a film metering mechanism wherein the advancement of the film, by rotating a winding device, brings an end of a stop arm into engagement with a toothed profile carried by the winding device to engage and stop the winding advance of the film.

It is a still further object of this invention to provide a plurality of equally spaced notches on the rotatable socket, each notch disposed to be engaged by a tab portion of a vertically reciprocable front actuating plate so as to retain the socket in a nonrotatable condition until the front plate is moved downwardly to cause an exposure and, when desired, a synchronized flash.

It is a still further object of this invention to provide a tongue portion of the stop arm disposed so as to engage the vertically movable front plate to prevent its downward travel and a double exposure until the exposed film has been wound from in way of the exposure area.

There has been chosen a specific embodiment of a film metering mechanism for flash cameras as adapted for use therewith and in the drawings is shown a preferred means for rotating a flash lamp socket to bring the contacts of the lamp into igniting relationship with a battery source, while the socket actuates a shutter arm to synchronize an exposure of the film. The socket is locked from moving except during exposure actuation and the film metering mechanism is adapted to release a lock to prevent double exposure until after the film has been advanced. This specific embodiment has been chosen for the purposes of illustration and description as shown in the accompanying drawings wherein:

BRIEF DESCRIPTION OF THE DRAWINGS

FIG. 1 represent a front view of the camera mechanism of this invention, the view being partly in section and showing a rotatable flash cube retaining socket in combination with film metering apparatus and a locking mechanism to prevent a double exposure;

FIG. 2 represents a plan or top view of the camera mechanism of FIG. 1, the view taken on the line 2–2 and locking in the direction of the arrows and showing the socket in a locked or retained condition while the film metering mechanism is in the film advanced condition;

FIG. 9 represents a fragmentary side view of the kick lever as it is used with the socket rotating mechanism;

FIG. 10 represents a fragmentary side view of the apparatus of FIG. 9 but with the kick lever moved to a forward position;

FIG. 11 represents a fragmentary plan view showing the film metering mechanism with the film in a forward or advanced position prior to and ready for the making of an exposure;

FIG. 12 represents a fragmentary and diagrammatic side view showing the relationship of the lever member of the film metering mechanism;

FIG. 13 represents a front view of the camera mechanism of FIG. 1 with the double exposure stop in engaged condition with the front plate;

FIG. 14 represents a plan or top view of the mechanism of FIG. 13, the view taken on the line 14–14 and looking in the direction of the arrows;

In the following description and in the claims various details will be identified by specific names for convenience. These names, however, are intended to be generic in their application. Corresponding reference characters refer to like members through the several figures of the drawings.

Figure 4:
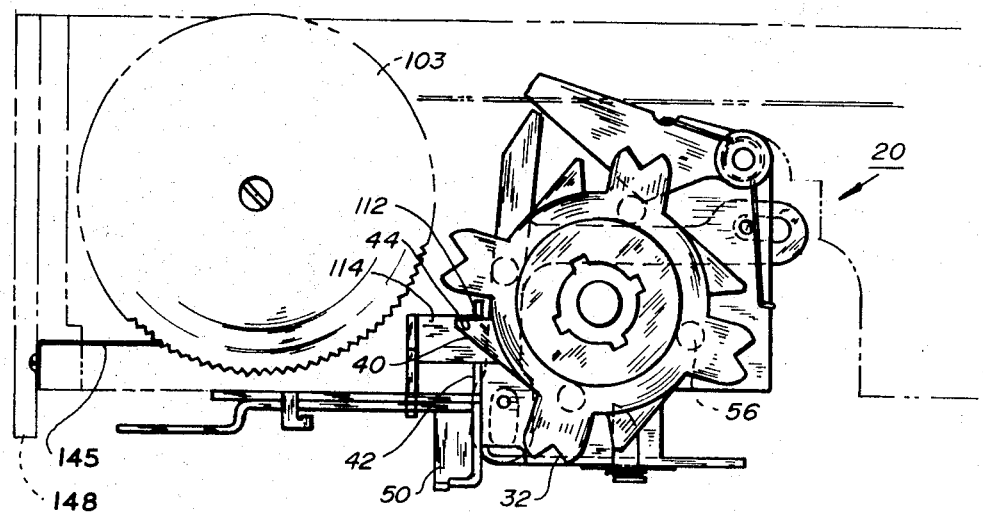
FIG. 4 represent a plan or top view of the mechanism of FIG. 3, the view taken on the line 4–4 and looking in the direction of the arrows and showing the socket in a released and partially rotated condition from the position of FIG. 2 while the film metering mechanism has been moved to the film wind or advance condition.
Figure 3:
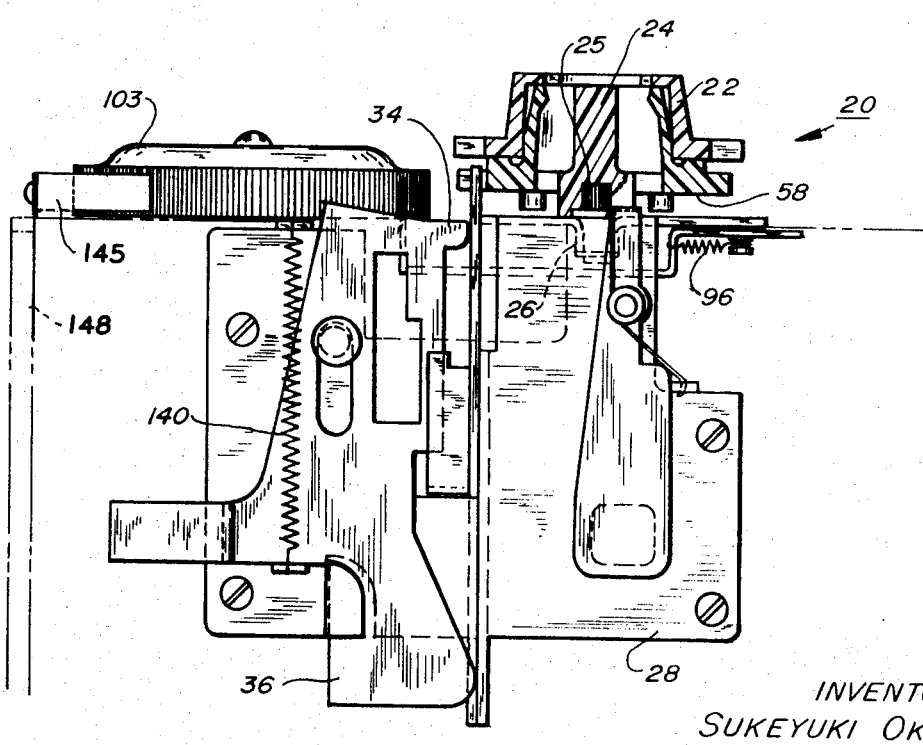
FIG. 3 represents a front view of the camera mechanism of FIG. 1 but with the release lever actuating member moved to its lowermost operating position.

The drawings accompanying, and forming part of this specification disclose certain details of construction for the purpose of explanation of the broader aspects of the invention, but it should be understood that structural details may be modified in various respects without departure from the concept and principles of the invention.

DESCRIPTION OF THE PREFERRED EMBODIMENT

Referring now in detail to the photoflash socket rotating and film metering apparatus of FIGS. 1 and 2, the apparatus includes a rotatable socket assembly adapted to removable receive multilamp photoflash assemblies such as those called "flashcubes." This socket assembly is generally identified as 20 and in FIG. 1 is shown in section. This assembly includes an outer shell 22 mounted on an inner molded core 24 which is mounted on, and is carried by, a pin 25. This pin is rotatably carried in a bearing journal 26 preferably formed as a part of a front plate 28. A snap ring or press-fit washer 29 is mounted on the lower end of the pin 25 so as to retain the socket 20 in the bearing journal 26 of the front plate 28.

Formed as an integral part of the outer shell 22 are four extending notch portions 30 which are equally disposed around the shell. A notch 32 is formed in the end of each portion 30 and is disposed to be entered and engaged by a tab portion 34 of a vertically reciprocable front slide or release lever member 36. This tab portion 34 of the member 36 is disposed to engage one of the notches 32 when the release lever member is in its "up" position. The notch 32 and tab 34 are sized and positioned so that when engaged the socket assembly 20 is restrained from rotating forwardly or backwardly. A shaped access 37 formed in the upper end of shell 22 is disposed to pass and receive the stem portion of a flashcube not shown. Spring fingers 38 are shaped so as to releasably grip the flash cube stem after the stem is passed through the access 37. The fingers 38, in the exemplified embodiment, are four in number and are molded as an integral part of the inner core 24. Immediately below the flange portion of shell 22, and as a part of the inner core 24, are wing members 40 which, as exemplified, are four in number and with the socket in the "at-rest" position of FIG. 2 an advancing kick lever 42 is adapted to be moved forwardly and to engage a face surface 44 of the one wing member 40 which lies just forwardly of lever 42. As also seen in FIGS. 9 and 10, this kick lever 42 is pivotally carried on a pin 46 mounted on an inturned ear 47 is biased to move counterclockwise around pin 46. A cam portion 50 of the lever 42 extends from the lever and is disposed at a determined angle to cam engaging shoulder 52 formed on the release lever member 36. As the lever member 36 is moved downwardly from the position of FIG. 9 to the position of FIG. 10, the shoulder 52 engages the rearward surface of cam portion 50 to cause lever 42 to move clockwise around pin 46. As release member 36 is moved downwardly, the tab 34 is moved from its position in notch 32 so that the forwardly moving upper end of lever 42 engages face 44 of wing member 40 to cause socket assembly 20 to be rotated counterclockwise in bearing journal 26 (FIG. 2). Also mounted on, or molded as a part of, the core member 24 are four downwardly extending pins 56 which extend below the lower surface 58 of the core member 24. It is, of course, assumed that a film is in the camera and by means of a metering apparatus has been brought to a position whereat it may be exposed by a shutter actuation to be here below described.

Referring now in particular to FIG. 2, it is to be noted that pivotally mounted on and carried by a rearwardly extending portion of the front plate 28 is a camming member 60. The right end of this member 60 is mounted on a pin 62 and by means of spring 64 is biased or urged in a counterclockwise direction as indicated by the arrow. A camming surfaces 66 of the member 60, as seen in dashed outline, is disposed to engage a downwardly extending pin 56 of the socket assembly 20. As is to be seen in the sequences depicted in FIGS. 4, 6 and 7, the counterclockwise rotation of the socket assembly 20 causes the pin 56 to engage surface 66 and move the member 60 outwardly. Leftwardly of, and at an angle of about 135° to surface 66, there is disposed an adjacent camming surface 67 which engages pin 56 at a later time in the rotation of the socket.

Referring once again to FIG. 1, it is to be noted that carried upon a front plate 28 is a shutter lever 70 pivotally mounted on a pin 72 carried by the plate 28. In its normal or "at-rest" attitude and as urged by spring 73, the lower portion of shutter lever 70 is disposed to cover an aperture 74 through which light is admitted to expose the film in the camera when the lower shutter end is moved leftwardly. The upper end of shutter lever 70 has an inturned arm portion 76 which lies in way of the transcribed path of the pins 56 as the socket 20 is rotated. The spring 73 is bent so as to be carried on pin 72 with one end engaging a tab 77 formed on the upper end of shutter lever 70 to urge the lever counterclockwise around the pin 72. The other end of the spring 73 is mounted in, and retained by, a stop member 78 which is carried by, and extends from, front plate 28. The left face or edge of stop member 78 is positioned so as to act as a positive and limiting stop for the rotational movement of the shutter lever 70 around pin 72.

Referring next to FIGS. 3, 4, 9 and 10, it is depicted that the mechanism of FIGS. 1 and 2 has been actuated so that front slide or release lever member 36 has been moved downwardly to its lowermost position. In this change of position, the tab 34 has been carried from locking engagement with the notch 32 of the socket 20. As thus release, the socket may be, and has been, rotated by the forward movement of thrust of kick lever 42 against a surface 44 of a wing member 40. The extent of movement is particularly noted in FIGS. 4 and 10 wherein the advancing lever 42 has moved forwardly to engage the face surface 44 and move wing member 40 to rotate the flash cube socket 20 about 30° from the "at-rest" position of FIG. 2. Camming member 60 has been cammed outwardly by pin 58 as it engages surface 66 and the rotation of the socket has brought the adjacent camming surface 67 into thrust engagement with pin 56 so as to urge socket 20 to its next "at-rest" position.

Figure 6:
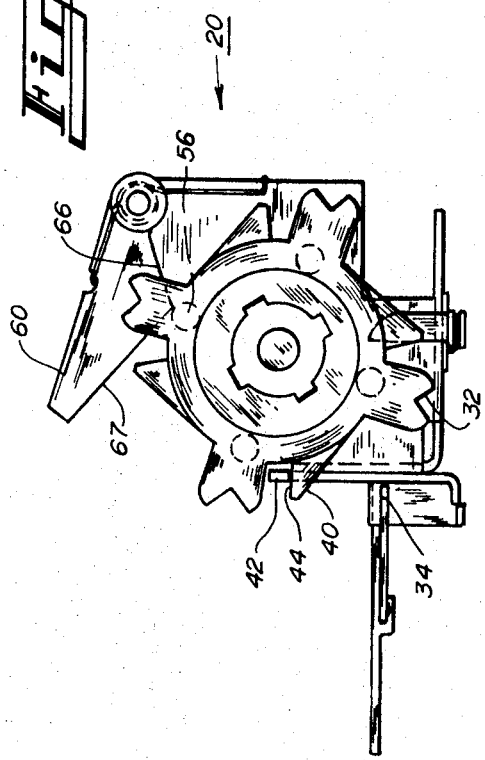
FIG. 6 represents a fragmentary plan view of the socket mechanism of FIG. 5 but with the socket released and partly rotated or advanced by the actuation of the kick lever.
Figure 7:
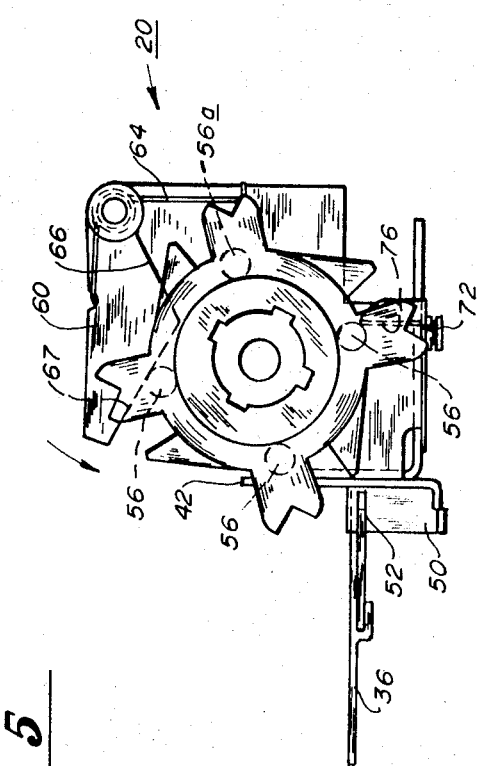
FIG. 7 represents a fragmentary plan view of the socket mechanism of FIG. 6 and in a still further rotated condition as advanced by a camming member means and with a pin portion of the socket in film-exposure engagement with the shutter member.
Figure 5:
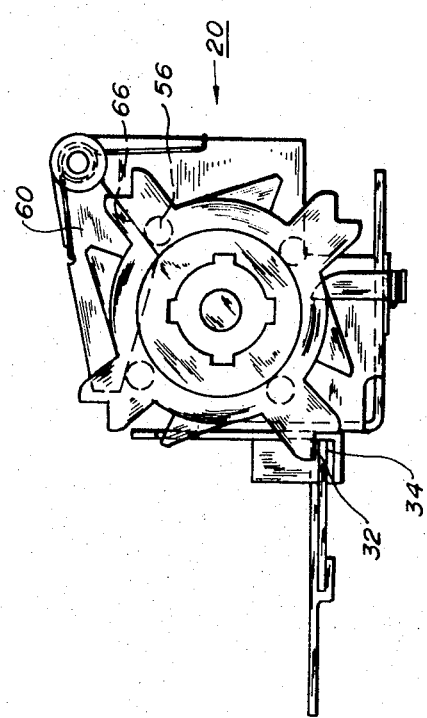
FIG. 5 represents a fragmentary plan view showing the socket mechanism in the condition of FIG. 1 and with the kick lever in its rearward position.

Referring next and particularly to the fragmentary plan views of FIGS. 5, 6 and 7, it is to be noted that in FIG. 5 the pin 56 is in engagement with the camming surface 66 of member 60. This fragmentary showing corresponds to the more detailed showing of FIG. 2 and as there is shown, and above-described the tab member 34 engages a notch 32 to provide a locked condition of the socket 20.

Referring next to the fragmentary view of FIG. 6, it is to be noted that the advancement of the flashcube socket 20 corresponds to the more detailed showing of FIG. 4 wherein the kick lever 42 has engaged surface 44 of wing member 40 and moved this wing member forwardly. Tab member 34 is below and out of engagement of notch 32, and pin 56 has passed the apex defining the camming surfaces 66 and 67.

Figure 8:
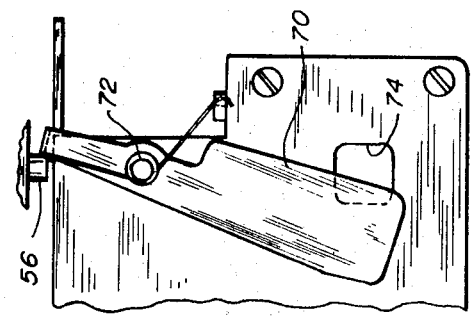
FIG. 8 represents a fragmentary front view of the mechanism as taken on the line 8–8 of FIG. 7 and looking in the direction of the arrows and showing the shutter arm in film-exposing condition.

Referring next to the fragmentary views of FIGS. 7 and 8, it is to be noted that flashcube socket 20 has been rotated further than in FIG. 6. The cam engaging shoulder 52, as it engages cam 50, moves kick lever 42 forwardly and when the front slide or release member 36 reaches its lowermost position of FIGS. 3 and 10, the socket 20 is advanced sufficiently so that pin 56 is brought from camming surface 66 and in way of the adjacent camming surface 67. For descriptive clarity of the operation, this camming surface 67 is hereinafter called the "propulsive" camming surface. After the pin 56 moves onto said propulsive camming surface 67, the spring 64 urges the member 60 in the direction as indicated by the arrow. This propulsive force causes the socket to continue to rotate until the succeeding pin 56a comes into engagement with camming surface 66. In its propulsive action, the spring 64 urges the socket 20 forwardly at substantially like rates of speed. The bias inherent in the construction of the spring is used as the generally governing factor in the propulsive action produced. As the camming member 60 engages a pin 56 to continue the rotation of the socket 20, a diametrically opposite pin 56 moves into engagement with the inturned arm portion 76 of the pivoted shutter lever 70 to cause the lever to move counterclockwise around pin 72 and provide a film exposure with the uncovering of aperture 74.

FILM METERING MECHANISM

In the feeding of film in a camera such as is contemplated in the preferred embodiment, it is desired that the film be precisely positioned in front of a shuttered aperture before the exposure is made. In the present invention, the film metering mechanism not only provides a precise positioning but in addition to, and in concert with precisely positioning of the film provides a means for preventing a double exposure to be made. Referring in particular to FIGS. 1, 2, 3, 4, 11, 12, 13 and 14, there is shown a film perforation lever 80 having one end carried by a headed pin 82 mounted on front plate 28. This pin is shouldered to not only retain the lever but also to permit the lever to slide in a slot 83 formed in the end of the lever. The shoulder of the pin 82 permits the lever to be reciprocably moved within the limits of the slot and also the lever may be swung around the pin 82. A tension spring 84 is attached to the lever 82 and to the rear portion 86 of the front plate or frame 28. This spring is disposed to urge lever 80 towards a film strip 88 as shown in phantom outline.

A stop lever 90, as seen in FIGS. 11 and 12, has a slot 92 formed in its rightward end. A shouldered pin 94 is mounted on plate 28 and enters and engages slot 92 to slidably retain lever 90. A tension spring 96 is attached at one end to the head of pin 94 and at its other end to the lever 90 so as to urge the lever 90 to the right. The lever 90, at a determined distance from pin 94, passes under perforation lever 80 and is pivotally attached thereto by means of a shouldered pin 98. The stop lever 90 then turns to the left towards pin 82 until about midway of the pins 98 and 82 whence it, the lever 90, turns again to the left to terminate in a vertically disposed stop-end portion 100. As seen in FIG. 2, the end 100 may enter and engage the notch between a pair of teeth 102 of a ratchet wheel 103. This wheel is rotated with and by the film winding mechanism until the end 100 is brought into engagement with the teeth of the wheel to stop its rotation and the film advance.

Referring to FIGS. 1, 2, 13 and 14, it is to be noted that a forwardly extending portion 104 is disposed to enter a cutout 106 formed in the front slide or release lever member 36. A step or relief 108 is made in the right-hand side of the cutout 106 to provide a shoulder 109. When stop lever 90 is moved to the left as in FIGS. 1 and 2, the extending portion 104 is free to move into that portion of cutout 106 which is above shoulder 109. In FIGS. 13 and 14, the stop lever 90 has been moved to the right by means of spring 96 and the extending portion 104 has been brought into the relief portion 108 so that extending portion 104 is in way of shoulder 109. In this condition the extending portion 104 acts to prevent a downward movement of the front slide or release member 36.

Referring to FIGS. 4, 9, 10, 11, 13 and 14, it is to be noted that kick lever 42, in addition to the cam portion 50 formed on its front portion, also has its upper end formed with a forward face 112, which upper portion engages the thrust face surface 44 of the wing member 40. The lower portion of face 112 is is disposed to engage the rearward edge 114 (FIGS. 4 and 11) of the stop lever 90 as the kick lever 42 is moved forwardly. At the end of its forward movement, the kick lever will have moved lever 90 and pivotally attached perforation lever 80 forwardly against the bias of spring 84 with the inner end of slot 83 in lever 80 approaching or engaging pin 82. With the forward movement of lever 90, the stop end 100 is moved from engagement with the teeth portion 102 of ratchet wheel 103. As the kick lever is permitted to move rearwardly to the position of FIG. 9, the spring 96 will pull stop lever 90 to the right and spring 84 will pull perforation lever 80 rearwardly. When kick lever 42 is at its rearward position the levers 80 and 90 will be disposed as in FIGS. 13 and 14.

Figure 15:
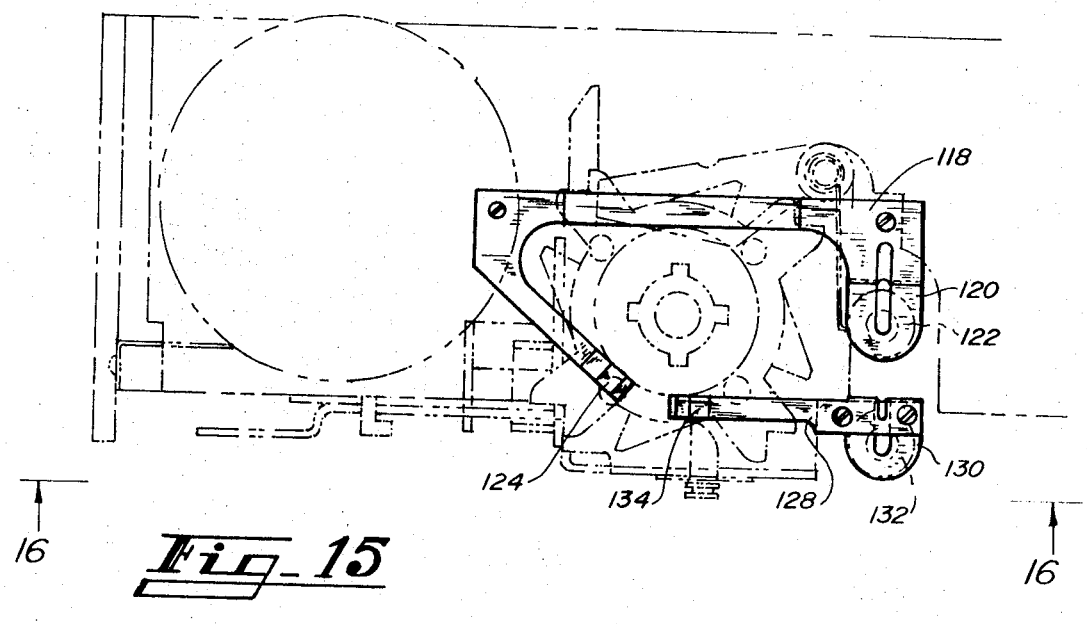
FIG. 15 represents a partly schematic plan view showing the relationship of the electrical conductive means and the contact ends as they are positioned in way of the contacts of a flash lamp which may be carried by the socket as it is rotated.
Figure 16:
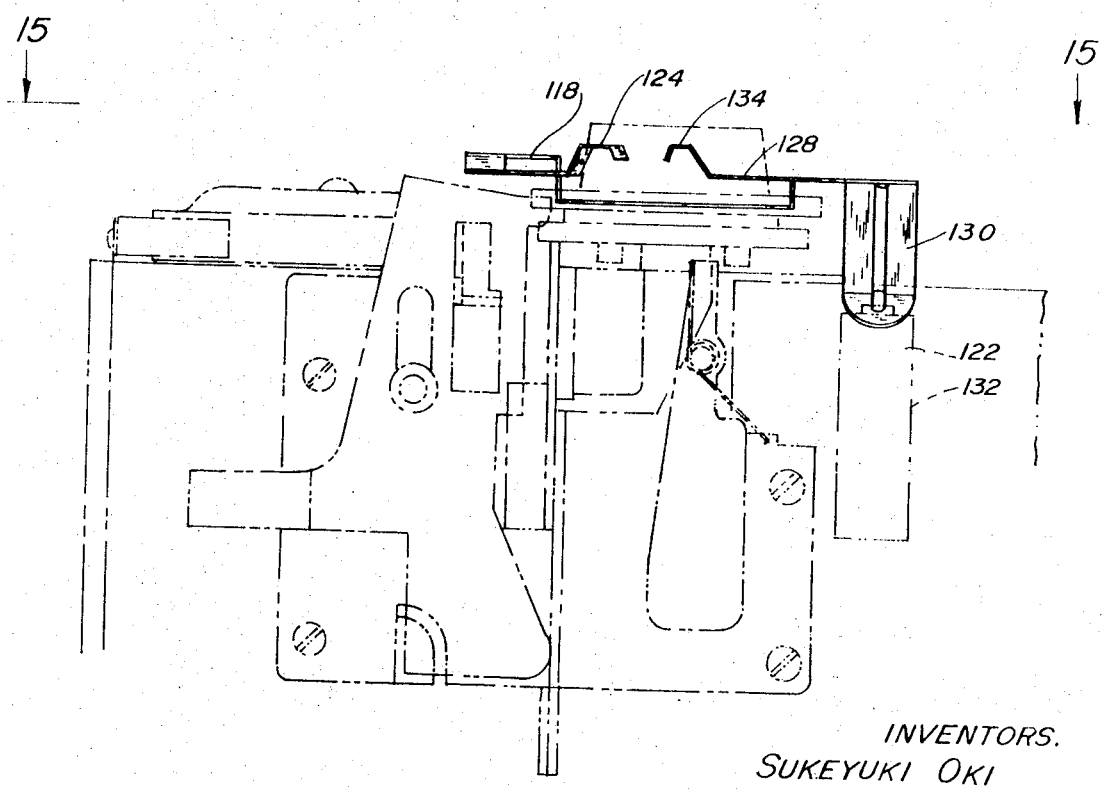
FIG. 16 represents a front view of the electrical conductive and contact system, the view taken on the line 15–15 of FIG. 15 and looking in the direction of the arrows.

Referring finally to FIGS. 15 and 16, there is shown a preferred flashcube igniting means for use in combination with the rotation of the socket 20. This igniting or "firing" means includes a conductor 118 attached to a camera body cover member not shown. This conductor 118 is formed and mounted so as to bring an inner end 120 in way of an end of a battery 122 as shown in phantom outlined in both FIGS. 15 and 16. This member 118, of course, is made of an electrically conductive material and is formed so that a spring end 124 is disposed to lie in a determined position and plane so as to conductively engage one of the contacts of a flash lamp as the socket 20, in its rotation, is brought to a position about 45° counterclockwise from the position of FIG. 2. This position is contemplated to bring the flash lamp to a like 45° position from the front when the conductive contact is made. A second conducting member 128 is also formed and mounted to the camera body cover so as to bring a downwardly extending end portion 130 into position so as to engage the end of another battery 132 as shown in phantom outline. A spring end 134 of the second conducting member 128 is disposed to lie in a determined position and plane so as to conductively engage the other one of the contacts of the flash lamp as the first lamp contact is engaged at its 45° rotational advance. The contacts provided by ends 124 and 134 are positioned to simultaneously contact and engage the conductive leads of the flash lamp as they are moved with the rotating socket to bring the leads in way of these contacts. Batteries 122 and 132, of course, are used to "fire" the flash lamp.

USE AND OPERATION

The camera mechanism above-described contemplates that the socket 20 will receive and removably retain a four-member flash lamp or "flashcube" currently commercially available. The leads of the several flash lamps, when the cube is mounted, are disposed to successively be rotated counterclockwise and in way of the electrical conductive lead ends 124 and 134 so the lamp is "fired" while it is in rotative motion and with the flash occuring between 45° and full front position. The shutter lever 70 is also actuated by the rotation of the socket 20 so that synchronization of flash "firing" and film exposure is simply and automatically accomplished.

With the flash lamp or flashcube mounted in the socket 20, it is necessary that the socket be locked against any rotation either accidental or intentional until the front slide or release member 36 is moved downwardly to actuate the kick lever 42. As tab 34 moves from in way of and below the notch 32 formed in notch portion 30, the socket assembly is free to be rotated. The rotational movement of the socket is accomplished by the engagement of the cam engaging shoulder 52 portion of release lever member 36 with the slop surface of cam portion 50 of the kick lever 42. As seen in FIGS. 9 and 10, the downward movement of shoulder 52, as it engages and traverses cam portion 50, causes kick lever 42 to rotate around pin 46. Forward face 112 of the kick lever engages face surface 44 of the wing member 40 and rotates the socket around pin 25. The leads of the flashcube are brought into engagement with spring ends 124 and 134 and the lamp is fired. A pin 56 on the socket 20 engages the arm portion 76 of shutter lever 70 to uncover aperture 74.

As the kick lever 42 moves forwardly, the forward face 112 of the kick lever engages the rearward edge 114 of stop lever 90 and moves it forwardly. As stop lever 90 moves forwardly, the perforation lever 80, which is pivotally attached thereto, is also moved forwardly causing the film engaged rearward end of the lever 80 to be withdrawn from the perforation of the film 88. When and as the engaged rearward end of the lever 80 becomes free of the film, the spring 96 draws lever 90 and pivotally attached lever 80 rightwardly and the combined levers 80 and 90 are disposed, as shown in FIG. 4. As and with the release of the front slide or release lever 36, a tension spring 140 moves the front slide 36 upwardly. The kick lever 42, as controlled by the engagement of cam portion 50 and cam engaging shoulder 52, is moved backwardly by spring 49 to the position seen in FIG. 9.

Spring 84 urges lever 80 rearwardly to bring the inner end of the lever into a light engagement with the film 88. This engagement with the film is just to the left of, or at a perforation, so that a winding of the film to draw it leftwardly permits the end of lever 80 to be urged into the perforation of the film as the perforation is brought in way of the end of lever 80. The forwardly extending portion 104 of lever 90 as it is moved rightwardly under and into blocking engagement with shoulder 109 of front slide 36 prevents a double exposure of film to be made by an accidental or incautious downward movement of front slide 36.

With its forward and rightward movement, the stop end portion 100 of stop lever 90 is disengaged from ratchet wheel 103 permitting said wheel to be rotated. A spring pawl or spring 145 is carried by the camera body 148 FIG. 4) and is disposed to engage the teeth portion 102 of wheel 103 so that rotation of wheel 103 is limited to counterclockwise rotation. This prevents any unwinding of the film. The winding of the film by counterclockwise rotation of ratchet wheel 103 draws the film 88 leftwardly until a perforation of the film is brought in way of the end of lever 80. This lever end, urged by the bias of spring 84, enters the perforation whereupon the engaged end of lever 80 is also moved leftwardly. This leftward movement continues until the end 100 of lever 90 is moved into engagement with teeth 102 to stop the rotation of the wheel 103 and the advancement of the film 88. Portion 104 is moved from under shoulder 109 of release lever 36 to the position of FIG. 1 whereat front slide or release lever 36 may now be moved downwardly to cause an exposure to be made. After the exposure is made, the above procedure is repeated until the exposure of the film is accomplished.

In the exemplified apparatus there is provided no cocking of the shutter nor is there provided a switch in the electrical circuit which needs be closed to complete the firing of the flash lamp. The socket is not rotated nor is it able to be rotated during the "at-rest" periods such as occur during the advancing or loading of the film or during the period of time the camera is "ready" to be fired or also after the exposure of the film frame.

As the action or period or period of time required to make the one-quarter turn movement of the socket is very short, the release of front slide member 36 by the operator always occurs after the socket rotation has ceased whereupon the notch 32 is in position to receive the upwardly moving member 36 as it is urged upwardly by the tension spring 140. This insures that the socket is always locked during all "at-rest" periods and is only moved as and when the release lever 36 is moved downwardly.

It is also to be noted that the flashcube socket 20 has no clutch means providing or permitting the flash cube to be rotated other than by the mechanism provided. It is also to be noted that there is no clutch means provided or desired between the film advance ratchet wheel 103 and the receiving film spool. With pawl 145 disposed to prevent reverse or clockwise rotation of wheel 103, the permitted counterclockwise rotation of the wheel 103 positively advances film 88 until the stop end 100 is brought into engagement with the teeth portion 102 and the double exposure preventing arrangement or portion 104 is moved from in way of shoulder 109.

Terms such as "left," "right," "up," "down," "bottom," "top," "front," "back," "in," "out," "clockwise," "counterclockwise" and the like are applicable to the embodiment as shown and described in conjunction with the drawings. There terms are used merely for the purposes of description and do not necessarily apply to the position in which the mechanism for causing a rotary flash lamp socket to be actuated or a film metering sequence to be performed may be constructed or used.

The conception of the mechanism for flashcube rotation and film metering is not limited to the specific embodiment shown but departures therefrom may be made and protection is sought to the broadest extent the prior art allows.

What we claim is:

1. A film metering advance and socket rotating mechanism for roll film cameras, the mechanism including: (a) a support; (b) a lamp socket rotatably carried by and on the support; (c) means for imparting rotative action to the socket; (d) a shutter member movable in response to the rotation of the socket, the rotation of the socket causing a movement of the shutter to be made in synchronization with the rotation of the socket, the movement of the shutter then permitting an exposure of a film to be made in determined relationship to the rotative condition of the socket; (e) a film perforation engaging lever having a first end movable in a determined path and plane so as to enter one of a series of perforations in the film, said engaging lever mounted so that the first end is movable into and from the plane of the film as well as in the plane of the perforations of the film; (f) means for urging said perforation engaging lever toward the plane of the film; (g) a stop lever having a first end retained in a movable manner on the support, said stop lever attached to and movable by the film engaging lever; (h) means for urging the film engaging lever and attached stop lever toward the unexposed end of the film; (i) a film advancing and winding mechanism carried by the support, and (j) a stop means carried on the stop lever and disposed to move into engagement with a portion of the film advancing and winding mechanism so as to stop the winding of the film when the film has been advanced a determined distance, whereby the first end of the film perforation lever as it is urged toward the plane of the film and the unexposed end of the film is disposed to enter a perforation of the film and when entered in the perforation to be moved by the film as the film is moved by said film advancing and winding mechanism, and with a determined distance of film advance the attached stop lever causes the stop means thereof to engage the film advancing and winding mechanism.

2. A film metering advance and socket rotating mechanism as in claim 1 in which the means for imparting a rotative action to the socket is a kick lever which is pivotally mounted on said support.

3. A film metering advance and socket rotating mechanism as in claim 2 in which the lamp socket is provided with a plurality of equally spaced shoulder portions each of which is disposed to be successively engaged by the kick lever to initiate rotative actuation of the socket.

4. A film metering advance and socket rotating mechanism as in claim 3 in which the spaced shoulder portions on the lamp socket are extending wing members and in which the kick lever has a forward face disposed to engage a face portion of a wing member as it, the kick lever, is advanced.

5. A film metering advance and socket rotating mechanism as in claim 2 in which there is provided a release lever having means for engaging kick lever and moving the kick lever in response to movement of the release lever.

6. A film metering advance and socket rotating mechanism as in claim 2 in which there is provided a release lever which is movable in a reciprocable cycle and has means for engaging the kick lever during a portion of the cycle to thereby move the kick lever in response to movement of the release lever.

7. A film metering advance and socket rotating mechanism as in claim 6 in which there is provided means for preventing actuation of the release lever prior to movement of an unexposed frame of film into the exposing position of the camera.

8. A film metering advance and rotating mechanism as in claim 7 in which the means for preventing actuation of the release lever is means carried by the stop lever to releasably engage a shoulder portion of the release lever to prevent actuation of the kick lever prior to the film perforation engaging lever being moved to its film-advanced forward position.

9. A film metering advance and rotating mechanism as in claim 8 in which the means for preventing actuation of said release lever carried by the stop lever is a forwardly extending portion which is disposed to move within a cutout formed in the release lever and is disposed to be moved into engagement with a shoulder formed in the cutout.

10. A film metering advance and socket rotating mechanism as in claim 6 in which the kick lever is provided with a cam member portion and the release lever is provided with a cam engaging shoulder portion, the cam engaging shoulder portion disposed to engage the cam member portion of the kick lever and move the kick lever as the release lever is moved a determined distance in its cycle.

11. A film metering advance and socket rotating mechanism as in claim 10 in which there is provided a biasing means disposed to engage the kick lever and urge the lever to an at-rest position.

12. A film metering advance and rotating mechanism as in claim 2 in which a portion of said kick lever engages the stop lever to move said film perforation engaging lever from engagement with the perforation of the film as the kick lever is moved.

13. A film metering advance and rotating mechanism as in claim 2 in which there is provided means movable for engaging the lamp socket to prevent rotation thereof prior to actuation of the kick lever.

14. A film metering advance and rotating mechanism as in claim 13 in which the kick lever is moved by an actuation of a release lever and in which means movable for engaging the lamp socket is a portion of the release lever, said portion disposed to enter and engage one of a plurality of notches formed in the socket.

15. A film metering advance and socket rotating mechanism as in claim 2 in which the socket is provided with a plurality of member portions extending from the socket and in which the shutter member is pivotally mounted on the support with a portion of the shutter disposed to be engaged by an extending member portion of the socket as it is rotated, said shutter member being spring-biased to engage a stop and when in engagement with said stop is adjacent to and covers an aperture which is disposed to admit light to a film when said aperture is uncovered.

16. A film metering advance and socket rotating mechanism as in claim 2 in which the socket has a plurality of equally spaced pin members extending downwardly therefrom and in which the shutter member has an arm portion disposed to lie in way of the transcribed path of said pin members as the socket is rotated.

17. A film metering advance and socket rotating mechanism as in claim 2 in which the kick lever in its forward movement is disposed to rotate the lamp socket a portion of the segment of rotation required to advance a lamp from a beginning socket position to a finishing position, said mechanism further including a camming member having first and second camming surfaces, and a plurality of equally spaced camming follower portions on said socket, the remaining portion of said segment of rotation being provided by said camming member being biased into engagement with one of said equally spaced camming follower portions, said last mentioned camming follower portion being disposed to engage said first cam surface on the camming member to move said member against the bias during the rotational movement of the socket provided by the forward movement of the kick lever, and at the termination of this portion of the rotational movement, the last mentioned camming follower portion on the socket is engaged by said second camming surface on the camming member wherein, and by the residual bias applied to said member, the last mentioned camming follower portion is moved to rotate the socket to its finishing position.

18. A film metering advance and rotating mechanism as in claim 17 in which the camming follower portions on the socket are pins and in which the socket in its beginning position has two adjacent pins of said equally spaced pins in engagement with the camming member for determinedly positioning the socket.

19. A film metering advance and rotating mechanism as in claim 18 in which the shutter member is pivotally mounted on the support and has an arm portion disposed to lie in the transcribed path of the equally spaced pins so as to be engaged by one of said pins to move the shutter to cause an exposure to be made in synchronization with the movement of the socket.

20. A film metering advance and socket rotating mechanism as in claim 1 in which there is provided a plurality of protruding means on the socket, each protruding means disposed to engage a portion of the shutter and move the shutter as it, the socket, is rotated.

21. A film metering advance and socket rotating mechanism as in claim 1 in which the film perforation engaging lever has a second end formed with a slot and in which a headed pin extends through said slot for supporting and slidably retaining said engaging lever.

22. A film metering advance and socket rotating mechanism as in claim 21 in which the headed pin which supports the slotted end of the lever is retained on a portion of the support.

23. A film metering advance and socket rotating mechanism as in claim 21 in which the means for urging the film perforation engaging lever toward the plane of the film is a tension spring having one end portion attached to the support and another portion attached to the perforation engaging lever.

24. A film metering advance and rotating mechanism as in claim 1 in which the stop lever has its first end retained in a slidably movable condition on the support and has an intermediate portion pivotally attached to the film perforation engaging lever.

25. A film metering advance and rotating mechanism as in claim 24 in which the means for urging the film engaging lever and attached stop lever toward the unexposed end of the film is a tension spring having an end portion connected to the stop lever and another portion connected to the support.

26. A film metering advance and rotating mechanism as in claim 1 in which the stop means on the stop lever is disposed to engage the film advancing and winding mechanism when the film has been advanced a distance equal to one exposed frame of film.

27. A film metering advance and rotating mechanism as in claim 26 in which the stop means is an end portion of the stop lever adapted to enter and engage a notch between a pair of teeth of a ratchet wheel which is a component of the film winding mechanism.

28. A film metering advance and rotating mechanism as in claim 1 in which the socket is disposed to receive a flash lamp and position the contacts of the lamp to extend beyond the socket and in which there are provided electrically conductive means disposed in the path of movement of the contacts of the rotating lamp, said conductive means when connected to a source of electrical energy disposed to engage said contacts of the rotating lamp during a segment of the rotation of the lamp to ignite said lamp.

29. A film metering advance and socket rotating mechanism as in claim 28 in which the lamp socket is adapted to receive and retain a flashcube and in which the electrically conductive means have their contacting ends spring-biased into the path of movement of the flash-cube contacts and at a contacting position intermediate the rotative movement of the socket.

30. A film metering advance and socket rotating mechanism as in claim 29 in which the shutter is actuated by at least one of four equally spaced pins carried by the socket, each pin being disposed in its sweep of movement to engage an arm portion of the shutter to actuate an exposure, the positioning of the pins and lamp contacts being disposed in a determined relationship to each other so that the igniting of a flash lamp occurs at substantially the same position in the socket rotation as does the actuation of the shutter thereby permitting a synchronized illuminated exposure to be made of a film.

UNITED STATES PATENT OFFICE
CERTIFICATE OF CORRECTION

Patent No. 3,585,915  Dated June 22, 1971

Inventor(s) Sukeyuki Oki et al.

It is certified that error appears in the above-identified patent and that said Letters Patent are hereby corrected as shown below:

Column 1, line 22, after "Jan. 16" insert a comma; line 35, "know" should read -- known --. Column 2, line 53, "represent" should read -- represents --; line 61, "locking" should read -- looking --; line 67, "represent" should read -- represents --. Column 4, line 13, after "ear 47" insert -- of front plate 28 and by means of a spring 49 the lever 42 --; line 38, "surfaces" should read -- surface --; line 72, "release" should read -- released --. Column 6, line 31, cancel "is", second occurrence. Column 7, line 22, "slop" should read -- sloped --. Column 8, line 13, cancel "or period", second occurrence; line 36, quotes are missing before "back" and "out"; line 38, "There" should read -- These --.

Signed and sealed this 23rd day of May 1972.

(SEAL)
Attest:

EDWARD M. FLETCHER, JR.  ROBERT GOTTSCHALK
Attesting Officer  Commissioner of Patents